May 17, 1938.  C. M. WILLSON  2,117,586
CIRCULAR SAW
Filed May 27, 1937
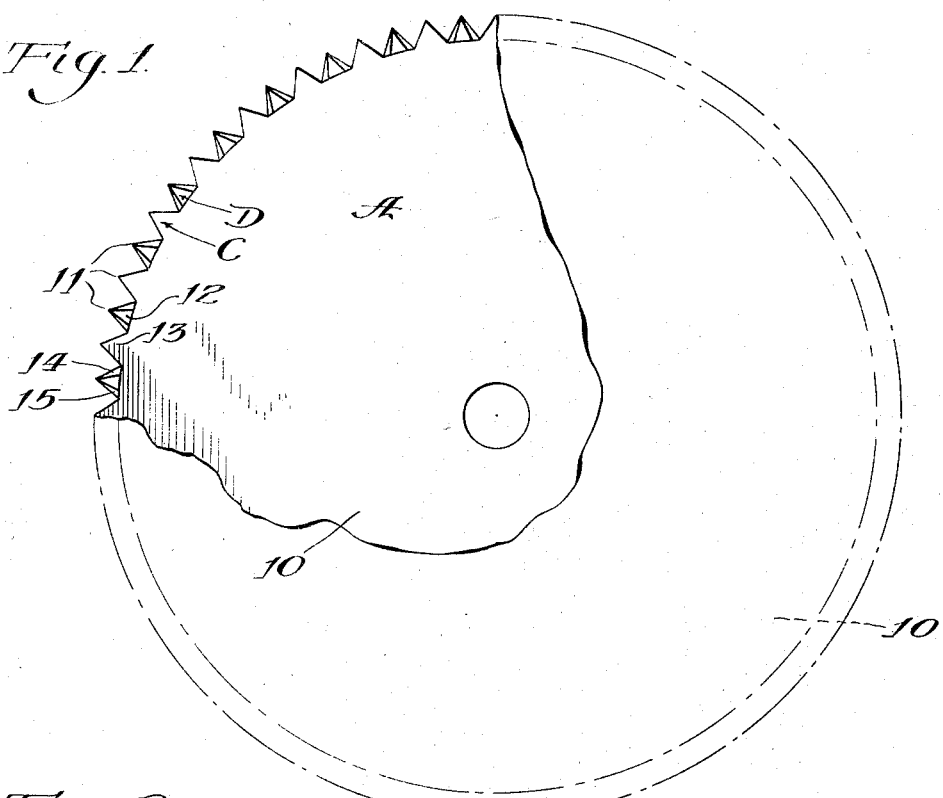
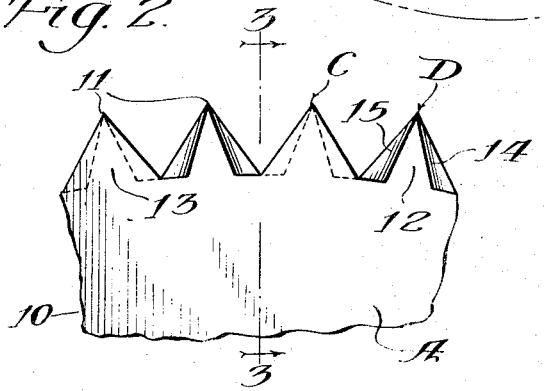
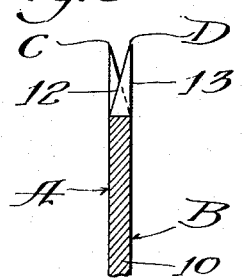
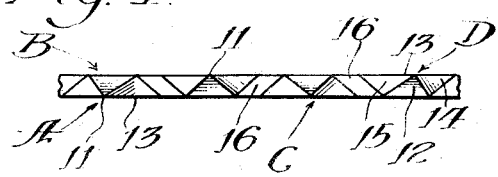
Inventor:
Charles M. Willson,
By Lee J. Gary
Attorney Patented May 17, 1938

2,117,586

UNITED STATES PATENT OFFICE 2,117,586

CIRCULAR SAW

Charles M. Willson, Bridgeport, Conn., assignor to Raybestos-Manhattan, Inc., Passaic, N. J., a corporation of New Jersey Application May 27, 1937, Serial No. 145,016

4 Claims. (Cl. 143—133)

This invention relates to improvements in a circular saw, and more particularly to the novel formation of the teeth thereof.

One of the objects of this invention is to provide a saw which is adapted to rapidly and efficiently cut soft materials, such as woven asbestos brake linings or clutch facings, with little waste.

Another object is to provide a circular saw blade the teeth of which require no set, with the result that the cut of the blade is no wider than its thickness, and which may be used during long periods without heating appreciably.

Another object is to form the cutting edge of the teeth of the saw blade out of the naturally harder surface of the blade, with the result that the edge is slow to wear and gives long life, and requires less frequent filing or re-sharpening.

Another object is to form a circular saw wherein each tooth is ground to form a plane extending from its external terminus to its root on the opposite side, and the wedge thus formed is filed to a knife edge on each side. This produces teeth having long and slender points, commonly described as a "shark's tooth", and the cutting is chiefly confined to alternating points on the external surface of the blade.

It will also be seen that owing to the small volume of material at the cutting edges of the teeth, very little filing is required to restore their sharpness, and due further to their long and slender shape and alternate positioning, ample provision for air circulation results so that the blade may operate for long periods and at a rapid speed without overheating.

A further object relates to the formation of the teeth so that although their roots are of the thickness of the blade, the cutting edge of each tooth lies alternately in opposite planes of the blade surface. This increases the strength of the teeth, and enables two edges of adjacent teeth to be sharpened with one file position.

Other objects and advantages will be readily apparent from a consideration of the following specification and drawing, wherein;

Fig. 1 is an elevation of my improved circular saw blade, one-fourth of the teeth being illustrated thereon.

Fig. 2 is an enlarged fragmentary elevation of the saw blade showing several of the teeth embodying my invention, and Fig. 3 is a section on the line 3—3 of Fig. 3.

Fig. 4 is a plan view of Fig. 2, and a projection thereof.

Referring to the drawing, 10 indicates in general a circular saw blade having two parallel sides A and B.

Extending around the periphery of the blade are a series of teeth all having a uniform shape, all of equal size, and being all evenly spaced. Each of the teeth is formed in the shape of a four sided pyramid and come to a fine point at their vertexes 11 formed by the meeting of their four planes in the surfaces 12, 13, 14, and 15. Each face of a tooth is in the shape of a triangle, so that a tetragonal pyramid is formed, the base of which is trapezoidal due to the parallel sides of the saw blade.

Each of the teeth D have one triangular shaped face 13 lying in the plane of the blade surface B, and each adjacent tooth C has one triangular shaped face 13 lying in the plane of the blade surface A, so that each alternate tooth has one surface lying in the plane of the blade, and is not set out therefrom.

The opposite side 12 of each tooth is also in the form of a triangle and lies in a plane extending obliquely from the base or root of the tooth at one side of the blade to the apex of the face of the tooth which lies in the plane of the opposite blade surface. It will thus be seen that the base or root of the tooth is formed of the full thickness of the blade and tapers to a fine point at the vertex 11.

Each of the teeth is provided with beveled edges to form the faces 14 and 15 which are also triangular in shape and extend from the base of the tooth to its vertex, to form intersecting planes with the surfaces 12 and 13. These faces are beveled at equal acute angles to the face 13 and their beveling provides clearances 16 extending obliquely across the width of the blade between each tooth. It will thus be seen that a file may be inserted in the clearance and the adjacent edges of two teeth may be sharpened by filing them at the same time, or with a single file position.

It will therefore be obvious that each tooth will have a strong base and come to a sharp point, and being of pyramidal shape will be formed of a minimum of material, and in addition being long and slender and alternately positioned allow a maximum of air circulation so that the blade will at all times run with a minimum heating effect. Also due to the fact that the face of each tooth that has the largest area coincides with, and is formed of the same material of the usually harder blade surface, a strong tooth structure results, and due to the fact that the teeth are not set or bent outwardly from the blade surface, all tendency to drag, heat and be excessively warm is eliminated.

The side bevelings which are cut to extend inwardly from the straight face to the tapered face, result in a cutting edge formed of the hard blade surface, and are therefore more slowly worn down than teeth formed otherwise, and due to the small volume of material left at the cutting edge, only a small amount of filing is ever necessary to restore the edge after use.

The resultant "shark's tooth" with its fine and thin cutting tip has been found to be most excellently adapted for cutting soft materials rapidly and with little waste, and due to the lack of set of the teeth and their general construction all tendency to crack while in use has been eliminated.

I claim as my invention:

1. In a circular saw blade, a tooth having one face thereof coincident with one surface of the saw blade, a second face thereof extending at an incline from the root of the tooth and the opposite blade surface to intersect said first mentioned surface, and a pair of oppositely inclined faces extending obliquely from said first mentioned face to said second mentioned face, each of said faces being in the form of a triangle and converging to a common vertex.

2. A circular saw blade having parallel side surfaces and provided with a series of equiformed and equispaced teeth, the adjacent teeth thereof having one of their opposite faces lying respectively in the opposite planes of the blade surfaces, and having a second face extending from said blade surface to the opposed blade surface at the base of said teeth, each of said teeth being obliquely beveled in opposed directions at equal angles to form intersecting faces with said aforementioned faces.

3. A circular saw blade comprising a series of equiformed and equispaced teeth, the adjacent teeth thereof each having one face alternatingly coinciding with the planes of the blade surfaces, and having a second face extending at an incline therefrom to the opposed blade surface at the base of said tooth, the said adjacent teeth being beveled at adjacent edges at equal angles.

4. A circular saw blade, comprising a series of equiformed and equispaced teeth, each of said teeth being in the form of a trapezoidal pyramid, one of the faces of each adjacent tooth lying in alternate planes of the blade surface, and having its opposite face extending from the plane of the opposite blade surface, the side faces of each of said teeth forming planes extending at equal acute angles from said first mentioned faces to said second mentioned faces.

CHARLES M. WILLSON.